US012792778B2

(12) United States Patent
Larson et al.

(10) Patent No.: US 12,792,778 B2
(45) **Date of Patent: *Nov. 10, 2026**

(54) FEDERATED PERSONALLY IDENTIFIABLE INFORMATION (PII) SERVICE

(71) Applicant: tZERO IP, LLC, Salt Lake City, UT (US)

(72) Inventors: Trent Norman Larson, Bountiful, UT (US); Eric Nathaniel Fish, Salt Lake City, UT (US); Andrew Warner, Midvale, UT (US)

(73) Assignee: tZERO IP, LLC, Salt Lake City, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/212,475

(22) Filed: May 19, 2025

(65) Prior Publication Data

US 2025/0278518 A1 Sep. 4, 2025

Related U.S. Application Data

(63) Continuation of application No. 17/933,317, filed on Sep. 19, 2022, now Pat. No. 12,306,991, which is a (Continued)

(51) Int. Cl.
*G06F 21/62* (2013.01)
*G06F 16/182* (2019.01)
(Continued)

(52) U.S. Cl.
CPC ........ *G06F 21/6254* (2013.01); *G06F 16/182* (2019.01); *G06F 16/86* (2019.01);
(Continued)

(58) Field of Classification Search
CPC .... G06F 21/6254; G06F 16/182; G06F 16/86; G06F 21/604; G06F 2221/2141;
(Continued)

(56) References Cited

U.S. PATENT DOCUMENTS

| | | | | |
|---|---|---|---|---|
| 9,858,781 | B1 * | 1/2018 | Campero | G06Q 20/363 |
| 10,833,843 | B1 * | 11/2020 | Vijayvergia | H04L 9/0637 |

(Continued)

FOREIGN PATENT DOCUMENTS

| | | | | |
|---|---|---|---|---|
| EP | 3259725 B1 * | 6/2020 | | H04L 9/50 |
| WO | WO-2016171349 A2 * | 10/2016 | | G06Q 20/3678 |

OTHER PUBLICATIONS

European Patent Office, "Extended European Search Report from EP Application No. 18870686.5", from Foreign Counterpart to U.S. Appl. No. 16/169,730, filed Jul. 6, 2021, pp. 1 through 8, Published: EP.

(Continued)

*Primary Examiner* — John B King
(74) *Attorney, Agent, or Firm* — Fogg & Powers LLC

(57) ABSTRACT

A system comprises: first, second, third computing device(s) and distributed ledger(s). Third computing device(s) store PII for accounts. First computing device(s) receive request to obtain PII regarding public information for first account from first user of second computing device(s). First computing device(s) determine that the third computing device (s) includes PII regarding public information for first account. First computing device(s) determine whether first user has permission to obtain PII regarding public information for first account from third computing device(s) that includes PII regarding public information for first account. First computing device(s) receive public information for first account from distributed ledger(s) when first user has permission to obtain PII regarding public information for first account from third computing device(s) that includes PII regarding public information for first account. First computing device(s) provide PII regarding public information for first account to first user of second computing device(s).

20 Claims, 5 Drawing Sheets

Related U.S. Application Data continuation of application No. 16/169,730, filed on Oct. 24, 2018, now Pat. No. 11,449,634.

(60) Provisional application No. 62/576,238, filed on Oct. 24, 2017.

(51) Int. Cl.

| | |
|---|---|
| ***G06F 16/84*** | (2019.01) |
| ***G06F 21/60*** | (2013.01) |
| ***G06Q 40/04*** | (2012.01) |
| ***H04L 9/40*** | (2022.01) |

(52) U.S. Cl.

CPC ........... *G06F 21/604* (2013.01); *G06Q 40/04* (2013.01); *H04L 63/102* (2013.01); *G06F 2221/2141* (2013.01)

(58) Field of Classification Search

CPC ...... G06Q 40/04; G06Q 40/046; G06Q 20/38; H04L 63/102; H04L 2463/102; H04L 63/0421; H04L 63/12

See application file for complete search history.

(56) References Cited

U.S. PATENT DOCUMENTS

| | | | | |
|---|---|---|---|---|
| 11,449,634 | B2 | 9/2022 | Larson et al. | |
| 12,306,991 | B2 * | 5/2025 | Larson | H04L 63/0421 |
| 2006/0085443 | A1 | 4/2006 | Pae et al. | |
| 2014/0059355 | A1 * | 2/2014 | Schuette | G06F 21/6218 713/189 |
| 2016/0342978 | A1 | 11/2016 | Davis et al. | |
| 2016/0342994 | A1 | 11/2016 | Davis | |
| 2017/0140375 | A1 | 5/2017 | Kunstel | |
| 2017/0178128 | A1 | 6/2017 | Fourez et al. | |
| 2017/0243213 | A1 | 8/2017 | Castinado et al. | |
| 2017/0244757 | A1 | 8/2017 | Castinado et al. | |
| 2017/0286717 | A1 | 10/2017 | Khi et al. | |
| 2018/0077151 | A1 * | 3/2018 | Campero | G06Q 20/363 |
| 2019/0122005 | A1 * | 4/2019 | Larson | H04L 63/12 |
| 2019/0199531 | A1 | 6/2019 | Staples et al. | |
| 2019/0311102 | A1 * | 10/2019 | Tussy | G06V 40/67 |
| 2023/0011047 | A1 | 1/2023 | Larson et al. | |
| 2023/0031087 | A1 * | 2/2023 | Tussy | G06F 21/53 |
| 2024/0265130 | A1 * | 8/2024 | Kacker | G06F 21/604 |
| 2025/0278518 | A1 * | 9/2025 | Larson | H04L 63/102 |

OTHER PUBLICATIONS

International Bureau, "International Preliminary Report on Patentability from PCT Application No. PCT/US2018/057360", from Foreign Counterpart to U.S. Appl. No. 16/169,730, filed May 7, 2020, pp. 1 through 10, Published: WO.

International Searching Authority, "International Search Report and Written Opinion from PCT Application No. PCT/US2018/057360 mailed Feb. 13, 2019", from Foreign Counterpart to U.S. Appl. No. 16/169,730, pp. 1-13, Published: WO.

U.S. Patent and Trademark Office, "Notice of Allowance", U.S. Appl. No. 16/169,730, May 13, 2021, pp. 1 through 8, Published: US.

U.S. Patent and Trademark Office, "Notice of Allowance", U.S. Appl. No. 16/169,730, filed Jul. 25, 2022, pp. 1 through 11, Published: US.

U.S. Patent and Trademark Office, "Notice of Allowance", U.S. Appl. No. 17/933,317, dated Jan. 16, 2025, pp. 1 through 9, Published: US.

U.S. Patent and Trademark Office, "Office Action", U.S. Appl. No. 16/169,730, filed Jan. 7, 2021 pp. 1 through 33, Published: US.

U.S. Patent and Trademark Office, "Office Action", U.S. Appl. No. 17/933,317 dated Sep. 10, 2024, pp. 1 through 46, Published: US.

* cited by examiner

FEDERATED PERSONALLY IDENTIFIABLE INFORMATION (PII) SERVICE

CROSS-REFERENCE TO RELATED APPLICATIONS

This application is a continuation of U.S. patent application Ser. No. 17/933,317 filed on Sep. 19, 2022, which is a continuation of U.S. patent application Ser. No. 16/169,730 filed on Oct. 24, 2018, which claims the benefit of U.S. Provisional Patent Application Ser. No. 62/576,238 filed on Oct. 24, 2017, entitled "FEDERATED PERSONALLY IDENTIFIABLE INFORMATION (PII) SERVICE", all of which are hereby incorporated herein by reference in their entirety.

BACKGROUND

Markets and exchanges can be used to trade stocks, currencies, bonds, commodities, etc. between buyers and sellers.

SUMMARY

A computing system includes: at least one server; at least one client communicatively coupled to the at least one server; at least one broker-dealer database storing personally identifiable information for accounts; and at least one distributed ledger communicatively coupled to the at least one server. The at least one server is configured to receive a request to obtain personally identifiable information regarding a trading history for a first account from a first user of a first client of the at least one client. The at least one server is configured to determine which broker-dealer database of the at least one broker-dealer database includes the personally identifiable information for the first account. The at least one server is configured to determine whether the first user has permission to obtain the personally identifiable information for the first account. The at least one server is configured to receive a trading history for the first account from a distributed ledger when the first user has permission to obtain the personally identifiable information for the first account. The at least one server is configured to map the personally identifiable information from the broker-dealer database with the public transaction information received from the at least one distributed ledger to generate mapped information.

DRAWINGS

Understanding that the drawings depict only exemplary embodiments and are not therefore to be considered limiting in scope, the exemplary embodiments will be described with additional specificity and detail through the use of the accompanying drawings, in which.

Figure 1:
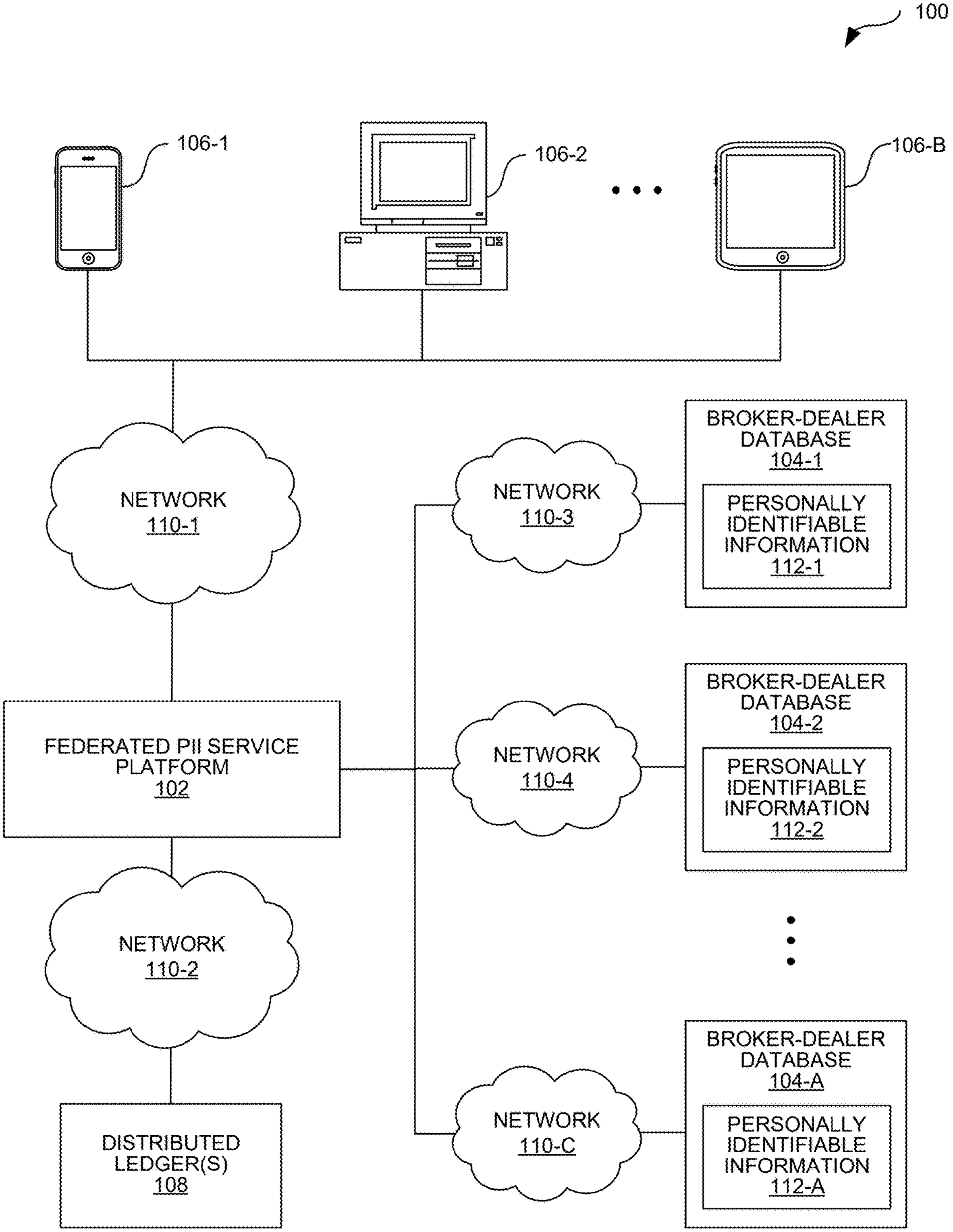
FIG. 1 is a block diagram of an example federated personally identifiable information (PII) service system.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

A distributed ledger is an electronic ledger that is distributed across multiple interconnected network nodes, where more than one of the network nodes stores a copy of the ledger. In some embodiments, distributed ledgers implement blockchains to validate the data stored within the distributed ledger.

A blockchain is a verifiable permanent ledger constructed one block at a time with a proof-of-work seal (such as a hash) affixed to each block that validates that block. In any blockchain, the hash of the previous block is included in the current block, and therefore by recursion the current hash also validates all previous blocks back to the original genesis block. Inserting a hash into a blockchain permanently records that hash and acts as a notary verifying the time stamped proof-of-existence of the hashed data at the moment in time that block is added to the chain. Any future blocks add a layer of protection from manipulation of the data stored in the chain or a chain re-org and therefore provide additional certainty that no changes can be made to blocks earlier in the chain.

In exemplary embodiments, a distributed ledger (such as a blockchain) is used to store information regarding public trades for at least one exchange/market. In exemplary embodiments, the distributed ledger is publically accessible, though it does not include personally identifiable information. In exemplary embodiments, the information stored on the chain may include public addresses for accounts participating in the trade (such as a sending account and a receiving account) and an indication of the asset being traded and the quantity of the asset being traded. In exemplary embodiments, this could be used as an alternative to traditional public exchanges/markets, such as those used for securities, currency, commodities, etc. There are benefits to not including personally identifiable information (PII) on a publicly accessible distributed ledger, including but not limited to increased privacy for individuals and entities engaging in trades, security of personally identifiable information (PII), and speed of the blockchain. That said, it may be beneficial for some individuals or entities to have access to more than just public addresses, asset types, and quantities of trades listed on the public distributed ledger (such as a blockchain). Described herein are embodiments of enabling mapping of personally identifiable information (PII) from external sources, such as broker databases, with anonymized data from a public distributed ledger.

FIG. 1 is a block diagram of an example federated personally identifiable information (PII) service system 100.

Federated PII service system 100 includes at least one federated PII service platform 102 connected to at least one broker dealer database 104 (such as broker-dealer database 104-1 and any quantity of optional broker dealer databases 104 such as optional broker dealer database 104-2 through optional broker dealer database 104-A), at least one computing device 106 (such as any of computing device 106-1 through 106-B), and at least one distributed ledger 108 by at least one network 110 (such as network 110-1 and any quantity of networks 110 through network 110-C). In exemplary embodiments, each broker-dealer database 104 stores personally identifiable information 112 (such as personally identifiable information 112-1 and any quantity of optional personally identifiable information 112 such as optional personally identifiable information 112-2 through personally identifiable information 112-A). In exemplary embodiments, the federated PII service system 100 and/or at least one federated PII service platform 102 are implemented at at least one of the trading venues for efficiency.

In exemplary embodiments, at least one network 110 includes separate networks between various components of the federated PII service system 100. In other exemplary embodiments, the at least one network 110 includes a single network between all the various components of the federated PII service system 100. In exemplary embodiments, the at least one network 110 includes at least one wired network and/or at least one wireless network. In exemplary embodiments, any combination of wired and wireless networks can be used for at least one network 110 (such as but not limited to at least one of at least one local area network (LAN), at least one wide area network (WAN), and the Internet). In exemplary embodiments, any combination of local area networks, wide area networks, and the Internet is used for the at least one network 110. In exemplary embodiments, the at least one computing device 106 are each communicatively coupled to the federated PII service platform 102 through at least one network 110. In exemplary embodiments, any quantity of intermediary devices are positioned in the communication path between a computing device 106 and the federated PII service platform 102, where the intermediary devices perform forwarding, relay, and/or routing of messages between the computing device 106 and the federated PII service platform 102. In exemplary embodiments, the at least one broker-dealer database 104 are each communicatively coupled to the federated PII service platform 102 through at least one network 110. In exemplary embodiments, any quantity of intermediary devices are positioned in the communication path between a broker-dealer database 104 and the federated PII service platform 102, where the intermediary devices perform forwarding, relay, and/or routing of messages between the broker-dealer database 104 and the federated PII service platform 102. In exemplary embodiments, the at least one distributed ledger 108 is coupled to the federated PII service platform 102 through at least one network 110. In exemplary embodiments, any quantity of intermediary devices are positioned in the communication path between the at least one distributed ledger 108 and the federated PII service platform 102, where the intermediary devices perform forwarding, relay, and/or routing of messages between the distributed ledger 108 and the federated PII service platform 102.

In exemplary embodiments, the federated PII service platform 102 and/or computing devices 106 can be any of a mobile computing device (such as a mobile phone, tablet computer, mobile media device, mobile gaming device, laptop computer, vehicle-based computer, etc.) or a non-mobile device (such as a dedicated terminal, a public terminal, a kiosk, a server, or a desktop computer). In exemplary embodiments, each computing device 106 can have similar components to exemplary federated PII service platform 102 shown in FIG. 2 and described below. In exemplary embodiments, each computing device 106 includes at least one memory, at least one processor, at least one network interface, at least one optional display device, at least one optional input device, and at least one power source. While the federated PII service platform 102 is shown as a distinct component from computing devices 106 within federated PII service system 100, in exemplary embodiments the federated PII service platform 102 is implemented on at least one of the computing devices 106, such that the computing device 106 implements the federated PII service platform 102 rather than it being implemented on a separated device.

In exemplary embodiments, the trading history is a trade history for any assets, including but not limited to, securities, bonds, currencies, funds (such as exchange traded funds ("ETFs"), mutual funds, index funds, open-end funds, closed-end funds, high yield bond funds, corporate bond funds, municipal bond funds, government bond funds, bond funds, money market funds, balanced funds, equity funds, fixed income funds, global funds, international funds, specialty funds, index funds, commodity funds, currency funds, and/or real estate funds), and/or other assets.

In exemplary embodiments, a user of a computing device 106 connects to the federated PII service platform 102 in order to map/overlay personally identifiable information (PII) over publicly available anonymized data from at least one distributed ledger 108. In exemplary embodiments, the computing device 106 connects to the federated PII service platform 102 using credentials which allow it to have access to PII information from at least one broker-dealer database 104. In exemplary embodiments, the computing device 106 transmits a first request from a first user to the federated PII service platform 102 to obtain personally identifiable information regarding a trading history for a first account. The federated PII service platform 102 then determines which of a plurality of broker-dealer databases 104 includes the personally identifiable information 112 for the first account. In exemplary embodiments, the federated PII service platform 102 determines which of the plurality of broker-dealer databases 104 includes the personally identifiable information 112 for the first account based on information received from one or more of the at least one broker-dealer database 104. In exemplary embodiments, the federated PII service platform 102 determines which of the plurality of broker-dealer databases 104 includes the personally identifiable information 112 for the first account at least in part by being configured to: (1) query one or more of the at least one broker-dealer database 104; (2) receive information back from the one or more of the at least one broker-dealer database 104 indicative of whether the one or more of the at least one broker-dealer database 104 includes the personally identifiable information 112 for the first account; and (3) determine which broker-dealer database 104 of the at least one broker-dealer database 104 includes the personally identifiable information for the first account based on the information received back from the one or more of the at least one broker-dealer database 104 indicative of whether the at least one broker-dealer database 104 includes the personally identifiable information for the first account.

The federated PII service platform 102 then determines whether the first user has permission to obtain the personally identifiable information 112 regarding the trading history for the first account. When the first user has permission to obtain the personally identifiable information 112 regarding the trading history for the first account, the federated PII service platform 102 provides mapping data to the communication portal enabling mapping of the personally identifiable information 112 regarding the trading history for the first account. In exemplary embodiments, the federated PII service platform 102 requests public trading information from the at least one distributed ledger 108. In exemplary embodiments, the personally identifiable information 112 from the broker-dealer database 104 is mapped with the public transaction information from the at least one distributed ledger 108.

Figure 2:
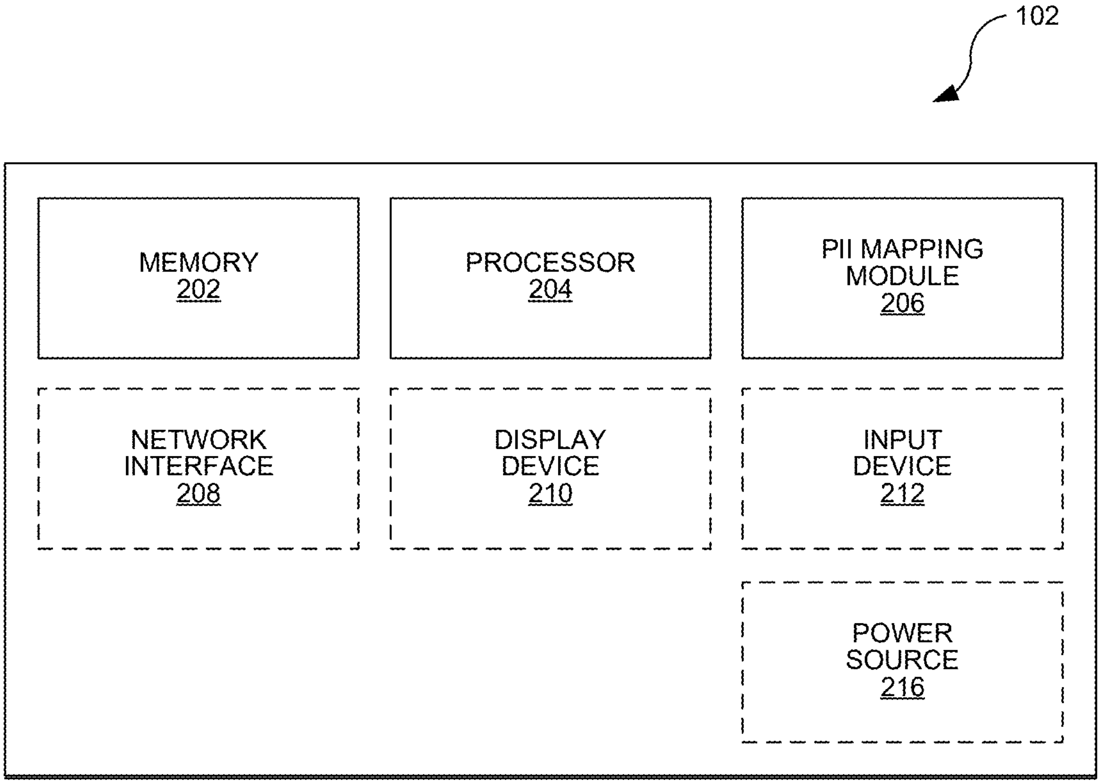
FIG. 2 is a block diagram of an example federated personally identifiable information (PII) service platform included within the federated personally identifiable information (PII) service system of FIG. 1.

FIG. 2 is a block diagram of federated PII service platform 102 included within the federated PII service system 100. Federated PII service platform 102 includes at least one memory 202, at least one processor 204, at least one PII mapping module 206, at least one network interface 208, at least one optional display device 210, at least one optional input device 212, and at least one optional power source 216.

In exemplary embodiments, the at least one memory 202 can be any device, mechanism, or populated data structure used for storing information. In exemplary embodiments, the at least one memory 202 can be or include any type of volatile memory, nonvolatile memory, and/or dynamic memory. For example, the at least one memory 202 can be random access memory, memory storage devices, optical memory devices, magnetic media, floppy disks, magnetic tapes, hard drives, erasable programmable read-only memories (EPROMs), electrically erasable programmable read-only memories (EEPROMs), optical media (such as compact discs, DVDs, Blu-ray Discs) and/or the like. In accordance with some embodiments, the at least one memory 202 may include one or more disk drives, flash drives, one or more databases, one or more tables, one or more files, local cache memories, processor cache memories, relational databases, flat databases, and/or the like. In addition, those of ordinary skill in the art will appreciate many additional devices and techniques for storing information which can be used as the at least one memory 202. The at least one memory 202 may be used to store instructions for running one or more applications or modules on the at least one processor 204. For example, the at least one memory 202 could be used in one or more embodiments to house all or some of the instructions needed to execute the functionality of the at least one PII mapping module 206 and/or the optional at least one PII mapping module 206. In exemplary embodiments, the at least one processor 204 can be any known processor, such as a general purpose processor (GPP) or special purpose (such as a field-programmable gate array (FPGA), application-specific integrated circuit (ASIC) or other integrated circuit or circuitry), or any programmable logic device. In exemplary embodiments, the at least one PII mapping module 206 is implemented by the at least one processor 204 and the at least one memory 202.

In exemplary embodiments, the optional at least one display device 210 includes at least one of a light emitting diode (LED), a liquid crystal display (LCD), a light emitting diode (LED) display, an organic light emitting diode (OLED) display, an e-ink display, a field emission display (FED), a surface-conduction electron-emitter display (SED), and a plasma display. In exemplary embodiments, the optional at least one input device 212 include at least one of a touchscreen (including capacitive and resistive touchscreens), a touchpad, a capacitive button, a mechanical button, a switch, a dial, a keyboard, a mouse, a camera, a biometric sensor/scanner, etc. In exemplary embodiments, the optional at least one display device 210 and the optional at least one input device 212 are combined into a human machine interface (HMI) for user interaction with the computing device 106.

In exemplary embodiments, the at least one optional network interface 208 is a cabled network interface configured for connection with a cabled media (such as but not limited to an Ethernet cable, a fiber optic cable, twisted pair, Category cabling, or other conductive or optical media). In exemplary embodiments, the at least one optional network interface 208 is a wireless network interface and includes or is coupled to at least one optional antenna for communication with a network. In exemplary embodiments, the at least one optional network interface 208 includes at least one of an Ethernet interface, a cellular radio access technology (RAT) radio, a WiFi radio, a Bluetooth radio, and a near field communication (NFC) radio. In exemplary embodiments, the at least one optional network interface 208 includes a cellular radio access technology radio configured to establish a cellular data connection (mobile internet) of sufficient speeds with a remote server using a local area network (LAN) or a wide area network (WAN). In exemplary embodiments, the cellular radio access technology includes at least one of Personal Communication Services (PCS), Specialized Mobile Radio (SMR) services, Enhanced Specialized Mobile Radio (ESMR) services, Advanced Wireless Services (AWS), Code Division Multiple Access (CDMA), Global System for Mobile Communications (GSM) services, Wideband Code Division Multiple Access (W-CDMA), Universal Mobile Telecommunications System (UMTS), Worldwide Interoperability for Microwave Access (WiMAX), 3rd Generation Partnership Projects (3GPP) Long Term Evolution (LTE), High Speed Packet Access (HSPA), third generation (3G) fourth generation (4G), fifth generation (5G), etc. or other appropriate communication services or a combination thereof. In exemplary embodiments, the at least one optional network interface 208 includes a WiFi (IEEE 802.11) radio configured to communicate with a wireless local area network that communicates with the remote server, rather than a wide area network. In exemplary embodiments, the at least one optional network interface 208 includes a near field radio communication device that is limited to close proximity communication, such as a passive near field communication (NFC) tag, an active near field communication (NFC) tag, a passive radio frequency identification (RFID) tag, an active radio frequency identification (RFID) tag, a proximity card, or other personal area network device. In exemplary embodiments, the same at least one optional network interface 208 is also used for communication with an external gateway device to a network (such as an NFC payment terminal).

In exemplary embodiments, at least one optional power source 216 is used to provide power to the various components of the federated PII service platform 102.

In exemplary embodiments, the PII mapping module 206 is implemented by the at least one processor 204, at least one memory 202, and/or other components within the federated PII service platform 102. In exemplary embodiments, the PII mapping module 206 is configured to receive a request from a computing device 106 for a user to connect to the federated PII service platform 102 using credentials which allow it to have access to PII information from at least one broker-dealer database 104. In exemplary embodiments, the PII mapping module 206 is configured to receive a request from a first user to obtain personally identifiable information regarding a trading history for a first account. The PII mapping module 206 then determines which of the plurality of broker-dealer databases 104 includes the personally identifiable information 112 for the first account. The PII mapping module 206 then determines which of the broker-dealer databases 104 includes the personally identifiable information 112 for the first account. In exemplary embodiments, the PII mapping module 206 determines which of the plurality of broker-dealer databases 104 includes the personally identifiable information 112 for the first account based on information received from one or more of the at least one broker-dealer database 104. In exemplary embodiments, the PII mapping module 206 determines which of the plurality of broker-dealer databases 104 includes the personally identifiable information 112 for the first account at least in part by being configured to: (1) query one or more of the at least one broker-dealer database 104; (2) receive information back from the one or more of the at least one broker-dealer database 104 indicative of whether the one or more of the at least one broker-dealer database 104 includes the personally identifiable information 112 for the first account; and (3) determine which broker-dealer database 104 of the at least one broker-dealer database 104 includes the personally identifiable information for the first account based on the information received back from the one or more of the at least one broker-dealer database 104 indicative of whether the at least one broker-dealer database 104 includes the personally identifiable information for the first account.

The PII mapping module 206 then determines whether the first user has permission to obtain the personally identifiable information 112 regarding the trading history for the first account. When the first user has permission to obtain the personally identifiable information 112 regarding the trading history for the first account, the broker-dealer database 104 provides mapping data to the PII mapping module 206 enabling mapping of the personally identifiable information 112 regarding the trading history for the first account. In exemplary embodiments, the PII mapping module 206 requests public transaction information from the at least one distributed ledger 108. In exemplary embodiments, the personally identifiable information 112 from the broker-dealer database 104 is mapped by the PII mapping module 206 with the public transaction information from the at least one distributed ledger 108. The mapped data is then provided by the PII mapping module 206 back to the computing device 106 that requested the information.

Figure 3:
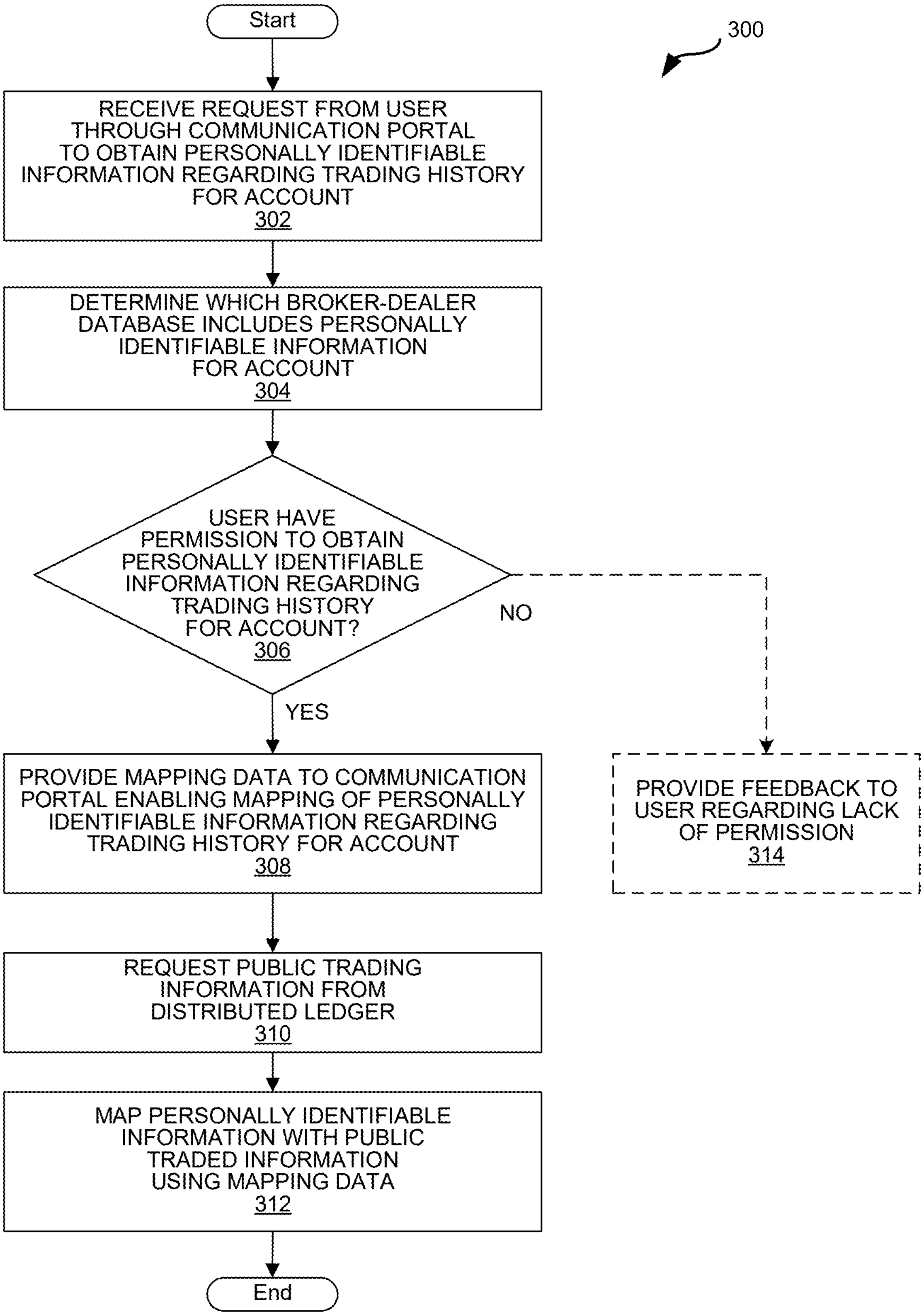
FIG. 3 is flow diagram of an exemplary method for implementing a federated personally identifiable information (PII) service system.

FIG. 3 is flow diagram of an exemplary method 300 for implementing a federated personally identifiable information (PII) service system (such as federated PII service system 100). Exemplary method 300 begins at block 302 with receiving a request from a user through a communication portal to obtain personally identifiable information regarding a trading history for an account. Exemplary method 300 proceeds to block 304 with determining which broker-dealer database includes personally identifiable information for the account. Exemplary method 300 proceeds to block 306 with determining whether the user has permission to obtain personally identifiable information regarding a trading history for the account. When the user has permission to obtain the personally identifiable information regarding the trading history for the account at block 306, exemplary method 300 proceeds to block 308 with providing mapping data to the communication portal enabling mapping of personally identifiable information regarding the trading history for the account. Exemplary method 300 proceeds to block 310 with requesting public trading information from a distributed ledger. Exemplary method 300 proceeds to block 312 with mapping personally identifiable information with the public trading information using the mapping data. In exemplary embodiments, when the user does not have permission to obtain the personally identifiable information regarding the trading history for the account at block 306, exemplary method 300 proceeds to optional block 314 with providing feedback to the user regarding a lack of permission.

Figure 4:
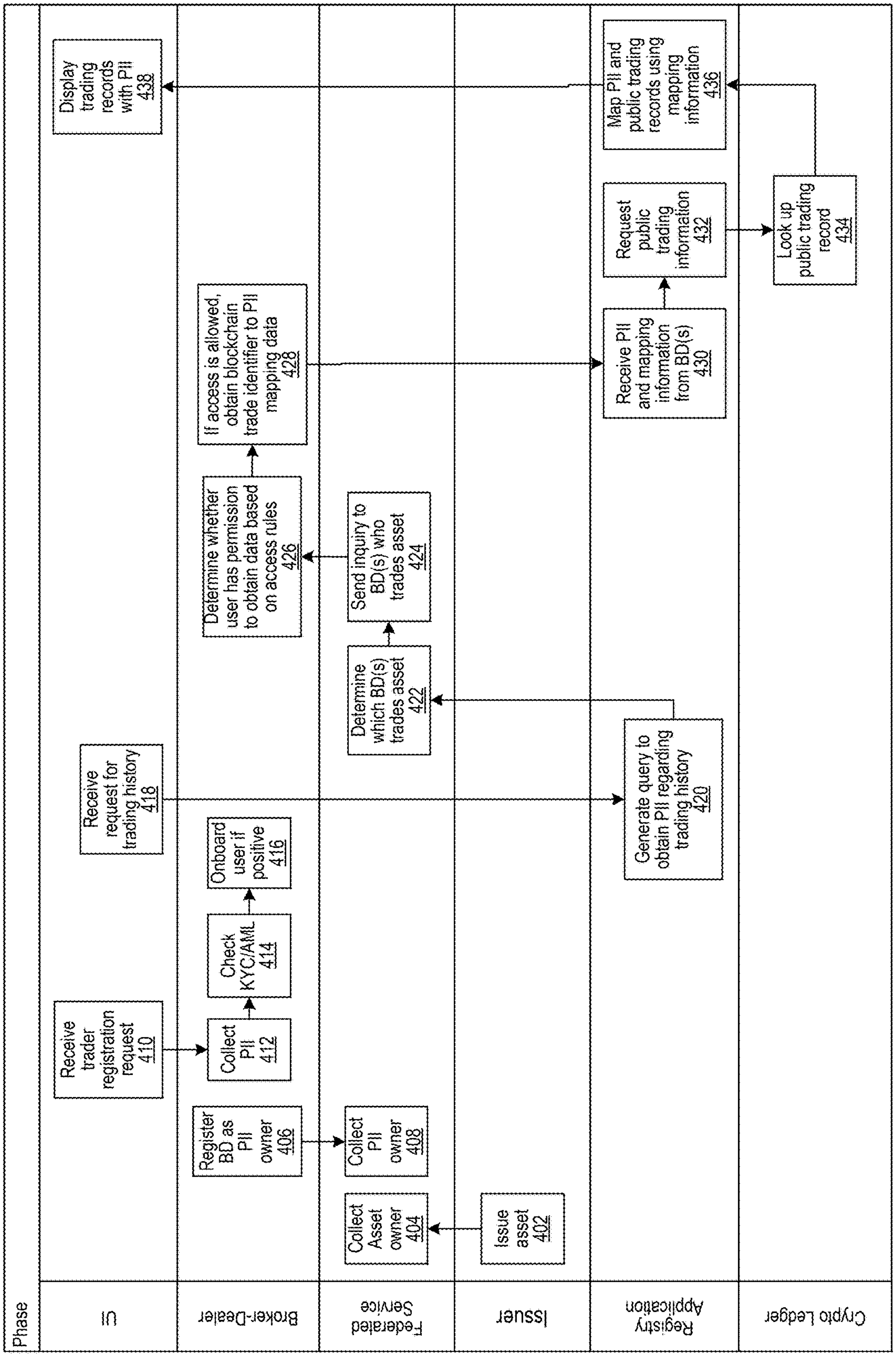
FIG. 4 is a flow diagram of an exemplary method for implementing a federated personally identifiable information (PII) service system.

FIG. 4 is a flow diagram of an exemplary method 400 for implementing a federated personally identifiable information (PII) service system (such as federated PII service system 100). Blocks 402 and 404 of exemplary method 400 illustrate what happens when an issuer issuing an asset for trading. Specifically, exemplary method 400 begins at block 402 with an issuer issuing an asset having a symbol. Exemplary method 400 proceeds to block 404 with the federated service collecting the symbol of the asset to register the symbol of the asset with the federated service. In exemplary embodiments, the issuer also registers the symbol of the asset with a trading venue.

Blocks 406 and 408 of exemplary method 400 illustrate what happens when a broker dealer starts allowing trades on a particular symbol and a trading venue. Specifically, exemplary method 400 proceeds to block 406 with the broker dealer (BD) registering PII information for the owner of a particular symbol for an asset. Exemplary method 400 proceeds to block 408 with the federated PII service collecting the API server information for the owner of PII for the particular asset symbol to register the API server information for the owner of PII for the particular asset symbol with the federated service. In exemplary embodiments, the issuer also registers the PII information for the owner of the particular symbol of the asset with a trading venue. In exemplary embodiments, each trading venue also acts as a federated service, which may be more efficient.

Blocks 410, 412, 414, and 416 of exemplary method 400 illustrate user onboarding for a new trading account for a new trading user. Specifically, exemplary method 400 begins at block 410 with receiving a trader registration request for a new trading account for a new trading user. Exemplary method 400 proceeds to block 412 with collecting personally identifiable information (PII) for the new trading user. Exemplary method 400 proceeds to block 414 with performing checks of know your customer (KYC)/anti-money laundering (AML) for the new trading user. If the user passes the KYC/AML checks at block 414, exemplary method 400 proceeds to block 416 with onboarding the new trading user and/or creating a new trading account.

Blocks 418, 420, 422, 424, 426, 428, 430, 432, 434, 436, and 438 of exemplary method 400 illustrate a trading history request for a particular trading account and/or trading user from a portal user using a communication portal. Specifically, exemplary method 400 proceeds to block 418 with receiving a request from a portal user at a communication portal for a trading history for a particular trading account and/or trading user. Exemplary method 400 proceeds to block 420 with generating a query to obtain personally identifiable information (PII) regarding a trading history for the particular trading account and/or trading user. Exemplary method 400 proceeds to block 422 with determining which broker dealer(s) (BD(s)) trades an asset for the particular trading account and/or trading user. Exemplary method 400 proceeds to block 424 with sending an inquiry to the broker dealer(s) who trades the asset for the particular trading account and/or trading user. Exemplary method 400 proceeds to block 426 with determining whether the portal user has permission to obtain PII data for the particular trading account and/or trading user based on access rules.

Exemplary method 400 proceeds to block 428 with obtaining the blockchain trade identifier to the PII mapping data for the particular trading account and/or trading user. Exemplary method 400 proceeds to block 430 with receiving PII and mapping information from broker dealer(s) for the particular trading account and/or trading user. Exemplary method 400 proceeds to block 432 with requesting public trading information 432 relating to the particular trading account and/or trading user. Exemplary method 400 proceeds to block 434 with looking up the public trading record 434 of the particular trading account and/or trading user. Exemplary method 400 proceeds to block 436 with mapping PII and public trading records for the particular trading account and/or trading user using the PII and mapping information received from the broker dealer(s). Exemplary method 400 proceeds to block 438 with displaying the trading records for the particular trading account and/or trading user with the PII mapped onto the trading records.

The techniques introduced here can be embodied as special-purpose hardware (such as circuitry), as programmable circuitry appropriately programmed with software and/or firmware, or as a combination of special-purpose and programmable circuitry. Hence, embodiments may include a machine-readable medium having stored thereon instructions that may be used to program a computer (or other electronic devices) to perform a process. The machine-readable medium may include, for example, floppy diskettes, optical disks, compact disc read-only memories (CD-ROMs), magneto-optical disks, read-only memories (ROMs), random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions.

Computer System Overview

Figure 5:
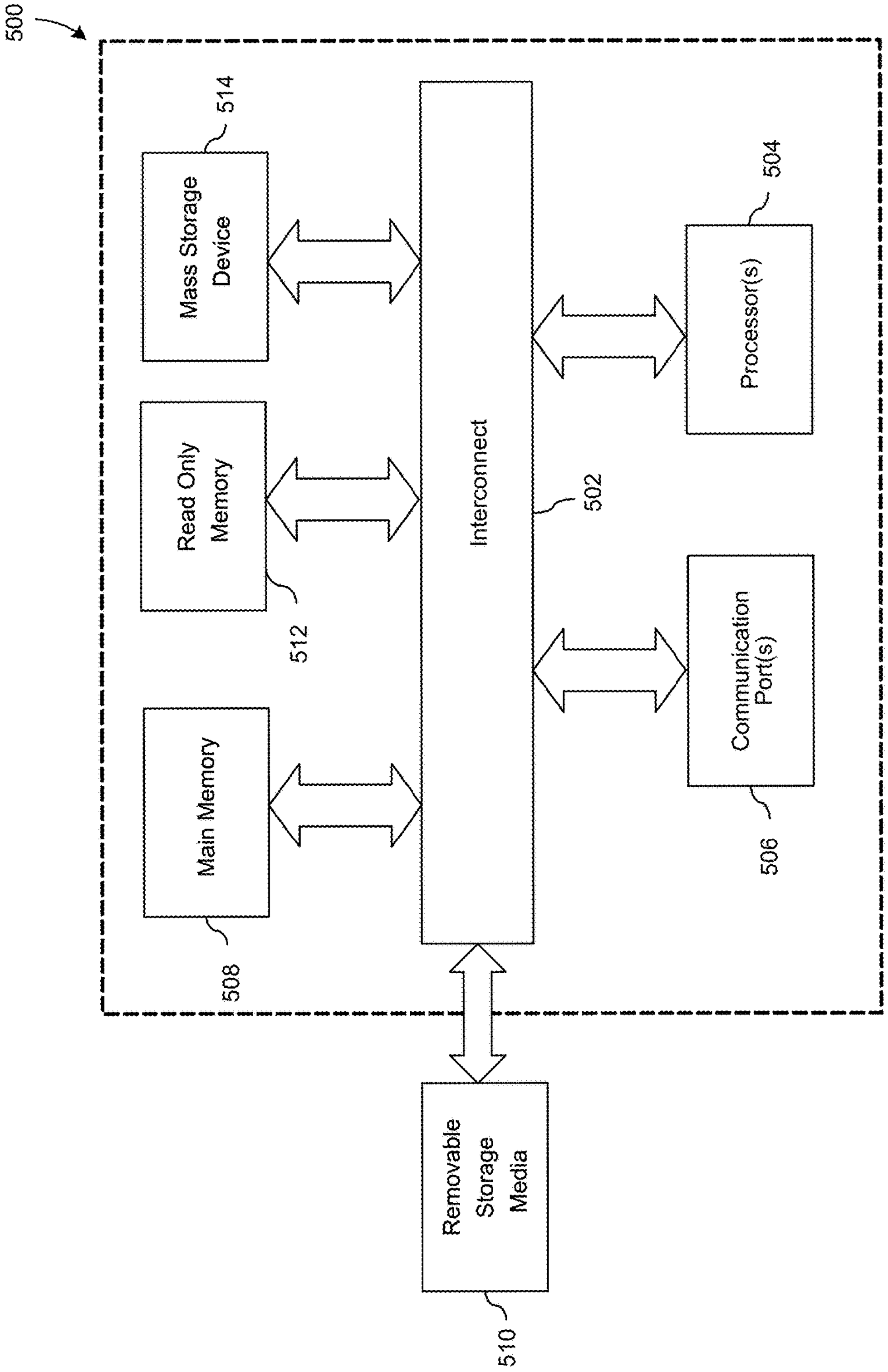
FIG. 5 illustrates an example of a computer system with which some embodiments of the present disclosure may be utilized.

Embodiments of the present disclosure include various steps and operations, which have been described above. A variety of these steps and operations may be performed by hardware components or may be embodied in machine-executable instructions, which may be used to cause a general-purpose or special-purpose processor programmed with the instructions to perform the steps. Alternatively, the steps may be performed by a combination of hardware, software, and/or firmware. As such, FIG. 5 is an example of a computer system 500 with which embodiments of the present disclosure may be utilized. According to the present example, the computer system 500 includes an interconnect 502, at least one processor 504, at least one communication port 506, at least one main memory 508, at least one removable storage media 510, at least one read only memory 512, and at least one mass storage device 514.

The at least one processor 504 can be any known processor. The at least one communication port 506 can be or include, for example, any of an RS-232 port for use with a modem-based dialup connection, a 10/100 Ethernet port, or a Gigabit port using copper or fiber. The nature of the at least one communication port 506 may be chosen depending on a network such a Local Area Network (LAN), Wide Area Network (WAN), or any network to which the computer system 500 connects. The at least one main memory 508 can be Random Access Memory (RAM), or any other dynamic storage device(s) commonly known in the art. The at least one read only memory 512 can be any static storage device (s) such as Programmable Read Only Memory (PROM) chips for storing static information such as instructions for the at least one processor 80.

The at least one mass storage device 514 can be used to store information and instructions. For example, hard disks such as the Adaptec® family of SCSI drives, an optical disc, an array of disks such as RAID, such as the Adaptec family of RAID drives, or any other mass storage devices may be used. Interconnect 502 can be or include one or more buses, bridges, controllers, adapters, and/or point-to-point connections. Interconnect 502 communicatively couples the at least one processor 504 with the other memory, storage, and communication blocks. Interconnect 502 can be a PCI/PCI-X or SCSI based system bus depending on the storage devices used. The at least one removable storage media 510 can be any kind of external hard-drives, floppy drives, Compact Disc-Read Only Memory (CD-ROM), Compact Disc-Re-Writable (CD-RW), Digital Video Disc-Read Only Memory (DVD-ROM).

The components described above are meant to exemplify some types of possibilities. In no way should the aforementioned examples limit the disclosure, as they are only exemplary embodiments.

Terminology

Brief definitions of terms, abbreviations, and phrases used throughout this application are given below.

The terms "connected", "coupled", and "communicatively coupled" and related terms are used in an operational sense and are not necessarily limited to a direct physical connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

The phrases "in exemplary embodiments", "in example embodiments", "in some embodiments," "according to some embodiments," "in the embodiments shown," "in other embodiments," "embodiments," and the like generally mean the particular feature, structure, or characteristic following the phrase is included in at least one embodiment of the present disclosure, and may be included in more than one embodiment of the present disclosure. In addition, such phrases do not necessarily refer to the same embodiments or different embodiments.

If the specification states a component or feature "may," "can," "could," or "might" be included or have a characteristic, that particular component or feature is not required to be included or have the characteristic.

The term "responsive" includes completely or partially responsive.

The term "module" refers broadly to a software, hardware, or firmware (or any combination thereof) component. Modules are typically functional components that can generate useful data or other output using specified input(s). A module may or may not be self-contained. An application program (also called an "application") may include one or more modules, or a module can include one or more application programs.

The term "network" generally refers to a group of interconnected devices capable of exchanging information. A network may be as few as several personal computers on a Local Area Network (LAN) or as large as the Internet, a worldwide network of computers. As used herein, "network" is intended to encompass any network capable of transmitting information from one entity to another. In some cases, a network may be comprised of multiple networks, even multiple heterogeneous networks, such as one or more border networks, voice networks, broadband networks, financial networks, service provider networks, Internet Service Provider (ISP) networks, and/or Public Switched Telephone Networks (PSTNs), interconnected via gateways operable to facilitate communications between and among the various networks.

Also, for the sake of illustration, various embodiments of the present disclosure have herein been described in the context of computer programs, physical components, and logical interactions within modern computer networks. Importantly, while these embodiments describe various embodiments of the present disclosure in relation to modern computer networks and programs, the method and apparatus described herein are equally applicable to other systems, devices, and networks as one skilled in the art will appreciate. As such, the illustrated applications of the embodiments of the present disclosure are not meant to be limiting, but instead are examples. Other systems, devices, and networks to which embodiments of the present disclosure are applicable include, for example, other types of communication and computer devices and systems. More specifically, embodiments are applicable to communication systems, services, and devices such as cell phone networks and compatible devices. In addition, embodiments are applicable to all levels of computing from the personal computer to large network mainframes and servers.

Although specific embodiments have been illustrated and described herein, it will be appreciated by those of ordinary skill in the art that any arrangement, which is calculated to achieve the same purpose, may be substituted for the specific embodiments shown. For example, while the embodiments described above refer to particular features, the scope of this disclosure also includes embodiments having different combinations of features and embodiments that do not include all of the described features. Accordingly, the scope of the present disclosure is intended to embrace all such alternatives, modifications, and variations as fall within the scope of the claims, together with all equivalents thereof. Therefore, it is manifestly intended that this invention be limited only by the claims and the equivalents thereof.

EXAMPLE EMBODIMENTS

Example 1 includes a computing system comprising: at least one server; at least one client communicatively coupled to the at least one server; at least one broker-dealer database storing personally identifiable information for accounts; at least one distributed ledger communicatively coupled to the at least one server; wherein the at least one server is configured to receive a request to obtain personally identifiable information regarding a trading history for a first account from a first user of a first client of the at least one client; wherein the at least one server is configured to determine which broker-dealer database of the at least one broker-dealer database includes the personally identifiable information for the first account; wherein the at least one server is configured to determine whether the first user has permission to obtain the personally identifiable information for the first account; wherein the at least one server is configured to receive a trading history for the first account from a distributed ledger when the first user has permission to obtain the personally identifiable information for the first account; wherein the at least one server is configured to map the personally identifiable information from the broker-dealer database with the public transaction information received from the at least one distributed ledger to generate mapped information.

Example 2 includes the computing system of Example 1, further comprising: wherein the at least one server is configured to provide the mapped information to the first user of the first client.

Example 3 includes the computing system of any of Examples 1-2, wherein the trading history stored in the distributed ledger is anonymized.

Example 4 includes the computing system of any of Examples 1-3, wherein the distributed ledger is a blockchain.

Example 5 includes the computing system of any of Examples 1-4, further comprising: wherein the at least one server is configured to provide feedback to the user regarding a lack of permission when the first user does not have permission to obtain the personally identifiable information for the first account.

Example 6 includes the computing system of any of Examples 1-5, further comprising: wherein a first subset of users has permission to obtain the personally identifiable information for the first account; and wherein a second subset of users does not have permission to obtain the personally identifiable information for the first account.

Example 7 includes the computing system of any of Examples 1-6, further comprising: wherein the first user has permission to obtain the personally identifiable information for the first account, but the first user does not have permission to obtain personally identifiable information for a second account.

Example 8 includes the computing system of any of Examples 1-7, wherein the at least one server is configured to determine which broker-dealer database of the at least one broker-dealer database includes the personally identifiable information for the first account based on information received from one or more of the at least one broker-dealer database.

Example 9 includes the computing system of any of Examples 1-8, wherein the at least one server is configured to determine which broker-dealer database of the at least one broker-dealer database includes the personally identifiable information for the first account at least in part by being configured to: query one or more of the at least one broker-dealer database; receive information back from the one or more of the at least one broker-dealer database indicative of whether the one or more of the at least one broker-dealer database includes the personally identifiable information for the first account; and determine which broker-dealer database of the at least one broker-dealer database includes the personally identifiable information for the first account based on the information received back from the one or more of the at least one broker-dealer database indicative of whether the at least one broker-dealer database includes the personally identifiable information for the first account.

Example 10 includes the computing system of any of Examples 1-9, wherein only one of the at least one broker-dealer databases includes the personally identifiable information for the first account.

Example 11 includes a computing system comprising: at least one processor; at least one memory communicatively coupled to the at least one processor; at least one network interface communicatively coupled to the at least one processor; wherein the at least one processor is configured to receive a request to obtain personally identifiable information regarding a trading history for a first account; wherein the at least one processor is configured to determine which broker-dealer database includes the personally identifiable information for the first account; wherein the at least one processor is configured to determine whether the first user has permission to obtain the personally identifiable information for the first account; wherein the at least one processor is configured to receive a trading history for the first account from a distributed ledger when the user has permission to obtain the personally identifiable information for the first account; wherein the at least one processor is configured to map the personally identifiable information from the broker-dealer database with the public transaction information received from the at least one distributed ledger.

Example 12 includes the computing system of Example 11, further comprising: wherein the at least one processor is configured to map the personally identifiable information from the broker-dealer database with the public transaction information received from the at least one distributed ledger.

Example 13 includes the computing system of any of Examples 11-12, wherein the trading history stored in the distributed ledger is anonymized.

Example 14 includes the computing system of any of Examples 11-13, wherein the distributed ledger is a blockchain.

Example 15 includes the computing system of any of Examples 11-14, further comprising: wherein the at least one processor is configured to provide feedback to the user regarding a lack of permission when the first user does not have permission to obtain the personally identifiable information for the first account.

Example 16 includes the computing system of any of Examples 11-15, further comprising: wherein a first subset of users has permission to obtain the personally identifiable information for the first account; and wherein a second subset of users does not have permission to obtain the personally identifiable information for the first account.

Example 17 includes the computing system of any of Examples 11-16, further comprising: wherein the first user has permission to obtain the personally identifiable information for the first account, but the first user does not have permission to obtain personally identifiable information for a second account.

Example 18 includes the computing system of any of Examples 11-17, wherein the at least one processor is configured to receive the request to obtain personally identifiable information regarding the trading history for the first account from a remotely located device using the at least one network interface.

Example 19 includes the computing system of any of Examples 11-18, further comprising: an input device for receiving input from a user; and wherein the at least one processor is configured to receive the request to obtain personally identifiable information regarding the trading history for the first account from a user using the input device of the computing system.

Example 20 includes the computing system of any of Examples 11-19, wherein the at least one processor is configured to determine which broker-dealer database includes the personally identifiable information for the first account based on information received from one or more of the at least one broker-dealer database.

Example 21 includes the computing system of any of Examples 11-20, wherein the at least one processor is configured to determine which broker-dealer database includes the personally identifiable information for the first account at least in part by being configured to: query at least one broker-dealer database; receive information back from the at least one broker-dealer database indicative of whether the at least one broker-dealer database includes the personally identifiable information for the first account; and determine which broker-dealer database includes the personally identifiable information for the first account based on the information received back from the at least one broker-dealer database indicative of whether the at least one broker-dealer database includes the personally identifiable information for the first account.

Example 22 includes the computing system of any of Examples 11-21, wherein only one broker-dealer database includes the personally identifiable information for the first account.

Example 23 includes a computerized method, the method comprising: receiving a first request from a first user through a communication portal to obtain personally identifiable information regarding a trading history for a first account; determining which of a plurality of broker-dealer databases includes the personally identifiable information for the first account; determining whether the first user has permission to obtain the personally identifiable information regarding the trading history for the first account; when the first user has permission to obtain the personally identifiable information regarding the trading history for the first account, providing mapping data to the communication portal enabling mapping of the personally identifiable information regarding the trading history for the first account; requesting public trading information from a distributed ledger; and mapping the personally identifiable information with the publicly traded information using the mapping data.

Example 24 includes the computerized method of Example 23, wherein determining whether the first user has permission to obtain the personally identifiable information regarding the trading history for the first account includes accessing a broker-dealer database including the personally identifiable information for the first account.

Example 25 includes the computerized method of any of Examples 23-24, further comprising: mapping the personally identifiable information from the broker-dealer database with the public transaction information received from the at least one distributed ledger.

Example 26 includes the computerized method of any of Examples 23-25, wherein the trading history stored in the distributed ledger is anonymized.

Example 27 includes the computerized method of any of Examples 23-26, wherein the distributed ledger is a blockchain.

Example 28 includes the computerized method of any of Examples 23-27, further comprising: providing feedback to the user regarding a lack of permission when the first user does not have permission to obtain the personally identifiable information for the first account.

Example 29 includes the computerized method of any of Examples 23-28, wherein determining which of a plurality of broker-dealer databases includes the personally identifiable information for the first account is based on information received from one or more of the plurality of broker-dealer databases.

Example 30 includes the computerized method of any of Examples 23-29, wherein determining which of a plurality of broker-dealer databases includes the personally identifiable information for the first account at least in part by: querying at least one broker-dealer database of the plurality of broker-dealer databases; receiving information back from the at least one broker-dealer database indicative of whether the at least one broker-dealer database includes the personally identifiable information for the first account; and determine which broker-dealer database of the plurality of broker-dealer databases includes the personally identifiable information for the first account based on the information received back from the at least one broker-dealer database indicative of whether the at least one broker-dealer database includes the personally identifiable information for the first account.

Example 31 includes the computerized method of any of Examples 23-30, wherein only one broker-dealer database of the plurality of broker-dealer databases includes the personally identifiable information for the first account.

What is claimed is:

1. A system comprising:

at least a first computing device;

at least a second computing device communicatively coupled to the at least the first computing device;

at least a third computing device storing personally identifiable information for accounts;

at least one distributed ledger communicatively coupled to the at least the first computing device; and wherein the at least the first computing device is configured to:

receive a request to obtain first personally identifiable information regarding public information for a first account from a first user of the at least the second computing device;

determine that the at least the third computing device includes the first personally identifiable information regarding the public information for the first account;

determine whether the first user has permission to obtain the first personally identifiable information regarding the public information for the first account from the at least the third computing device that includes the first personally identifiable information regarding the public information for the first account;

receive the public information for the first account from the at least one distributed ledger when the first user has permission to obtain the first personally identifiable information regarding the public information for the first account from the at least the third computing device that includes the first personally identifiable information regarding the public information for the first account; and provide the first personally identifiable information regarding the public information for the first account to the first user of the at least the second computing device.

2. The system of claim 1, wherein the at least the first computing device is configured to:

map (1) the first personally identifiable information from the at least the third computing device that includes the first personally identifiable information regarding the public information for the first account with (2) the public information for the first account received from the at least one distributed ledger to generate mapped information; and provide the first personally identifiable information regarding the public information for the first account to the first user of the at least the second computing device by being configured to provide the mapped information to the first user of the at least the second computing device.

3. The system of claim 1, wherein the at least one distributed ledger includes a blockchain.

4. The system of claim 1, further comprising:

wherein a first subset of users has permission to obtain the first personally identifiable information regarding the public information for the first account; and wherein a second subset of users does not have permission to obtain the first personally identifiable information regarding the public information for the first account.

5. The system of claim 1, wherein the first user has permission to obtain the first personally identifiable information regarding the public information for the first account, but the first user does not have permission to obtain the first personally identifiable information for a second account.

6. The system of claim 1, wherein the at least the first computing device is configured to:

determine that the first personally identifiable information of the at least the third computing device includes the first personally identifiable information regarding the public information for the first account based on information received from one or more of the at least the third computing device.

7. The system of claim 1, wherein the at least the first computing device is configured to determine that the first personally identifiable information of the at least the third computing device includes the first personally identifiable information regarding the public information for the first account at least in part by being configured to:

query one or more of the at least the third computing device;

receive information back from the at least the third computing device indicative of whether the at least the third computing device includes the first personally identifiable information regarding the public information for the first account; and determine that the first personally identifiable information of the at least the third computing device includes the first personally identifiable information regarding the public information for the first account based on the information received back from the at least the third computing device indicative of whether the at least the third computing device includes the first personally identifiable information regarding the public information for the first account.

8. A system comprising:

circuitry configured to:

receive a request to obtain first personally identifiable information regarding public information for a first account;

determine that at least a first computing device includes the first personally identifiable information regarding the public information for the first account;

determine whether a first user has permission to obtain the first personally identifiable information regarding the public information for the first account from the at least the first computing device that includes the first personally identifiable information regarding the public information for the first account;

receive the public information for the first account from at least one distributed ledger when the first user has permission to obtain the first personally identifiable information regarding the public information for the first account from the at least the first computing device that includes the first personally identifiable information regarding the public information for the first account; and provide the first personally identifiable information regarding the public information for the first account to the first user.

9. The system of claim 8, wherein the circuitry is further configured to:

map (1) the first personally identifiable information from the at least the first computing device that includes the first personally identifiable information regarding the public information for the first account with (2) the public information for the first account received from the at least one distributed ledger to generate mapped information; and provide the first personally identifiable information regarding the public information for the first account to the first user by providing the mapped information to the first user.

10. The system of claim 8, wherein the at least one distributed ledger includes a blockchain.

11. The system of claim 8, further comprising:

wherein a first subset of users has permission to obtain the first personally identifiable information regarding the public information for the first account; and wherein a second subset of users does not have permission to obtain the first personally identifiable information regarding the public information for the first account.

12. The system of claim 8, wherein the first user has permission to obtain the first personally identifiable information regarding the public information for the first account, but the first user does not have permission to obtain second personally identifiable information for a second account.

13. The system of claim 8, wherein the circuitry is configured to:

receive the request to obtain the first personally identifiable information regarding the public information for the first account from a remotely located device using the circuitry.

14. The system of claim 8, further comprising:

an input device for receiving input from the first user; and wherein the circuitry is configured to receive the request to obtain the first personally identifiable information regarding the public information for the first account from the first user using the input device of the system.

15. The system of claim 8, wherein the circuitry is configured to determine that the at least the first computing device includes the first personally identifiable information regarding the public information for the first account based on information received from the at least the first computing device.

16. The system of claim 8, wherein the circuitry is configured to determine that the at least the first computing device includes the first personally identifiable information regarding the public information for the first account at least in part by being configured to:

query the at least the first computing device;

receive information back from the at least the first computing device indicative of whether the at least the first computing device includes the first personally identifiable information regarding the public information for the first account; and determine that the at least the first computing device includes the first personally identifiable information regarding the public information for the first account based on the information received back from the at least the first computing device indicative of whether the at least the first computing device includes the first personally identifiable information regarding the public information for the first account.

17. A method comprising:

receiving a first request from a first user through at least a first computing device to obtain first personally identifiable information regarding public information for a first account;

determining that the at least a second computing device includes the first personally identifiable information regarding the public information for the first account;

determining whether the first user has permission to obtain the first personally identifiable information regarding the public information for the first account from the at least the second computing device that includes the first personally identifiable information regarding the public information for the first account;

receiving the public information for the first account from at least one distributed ledger when the first user has permission to obtain the first personally identifiable information from the first account from the at least the second computing device that includes the first personally identifiable information regarding the public information for the first account; and providing the first personally identifiable information regarding the public information for the first account to the first user.

18. The method of claim 17, further comprising:

mapping (1) the first personally identifiable information from the at least the second computing device that includes the first personally identifiable information regarding the public information for the first account with (2) the public information for the first account from the at least one distributed ledger to generate mapped information; and providing the first personally identifiable information regarding the public information for the first account to the first user by providing the mapped information to the first user.

19. The method of claim 17, wherein the at least one distributed ledger includes a blockchain.

20. The method of claim 17, wherein determining that the at least the second computing device includes the first personally identifiable information regarding the public information for the first account is based on information received from the at least the second computing device.

* * * * *